(12) United States Patent
Kimura (10) Patent No.: US 10,326,184 B2
(45) Date of Patent: Jun. 18, 2019

(54) BATTERY PACK

(71) Applicant: TOYOTA JIDOSHA KABUSHIKI KAISHA, Toyota-shi, Aichi-ken (JP)

(72) Inventor: Kenji Kimura, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 324 days.

(21) Appl. No.: 14/976,599

(22) Filed: Dec. 21, 2015

(65) Prior Publication Data
US 2016/0190662 A1    Jun. 30, 2016

(30) Foreign Application Priority Data

Dec. 26, 2014   (JP) ................................. 2014-265171

(51) Int. Cl.
*H01M 10/6551*   (2014.01)
*H01M 10/613*    (2014.01)
(Continued)

(52) U.S. Cl.
CPC ..... *H01M 10/6551* (2015.04); *H01M 2/1077* (2013.01); *H01M 10/617* (2015.04); *H01M 10/625* (2015.04); *H01M 10/643* (2015.04); *H01M 10/658* (2015.04); *H01M 10/6554* (2015.04); *H01M 10/6561* (2015.04); *H01M 10/6563* (2015.04); *H01M 10/6564* (2015.04); (Continued)

(58) Field of Classification Search
CPC ........ H01M 10/6551; H01M 10/6561; H01M 10/6554; H01M 10/643; H01M 10/625; H01M 10/658; H01M 10/617; H01M 2/1077; H01M 10/655; H01M 10/6563; H01M 10/6564; H01M 10/6566; H01M 2220/20
See application file for complete search history.

(56) References Cited

U.S. PATENT DOCUMENTS

2011/0064997 A1*  3/2011  Peskar ................ H01M 2/1022
                                                          429/185
2011/0293980 A1* 12/2011  Tartaglia ............ H01M 2/1094
                                                          429/100
(Continued)

FOREIGN PATENT DOCUMENTS

CN       104159764 A    11/2014
JP       2008-140630 A   6/2008
(Continued)

*Primary Examiner* — Ula C Ruddock
*Assistant Examiner* — Matthew W Van Oudenaren
(74) *Attorney, Agent, or Firm* — Sughrue Mion, PLLC (57) ABSTRACT

A battery pack includes cylindrical batteries, a thermal diffusing plate, and a casing. The thermal diffusing plate holds the cylindrical batteries. The casing houses the cylindrical batteries and the thermal diffusing plate. The casing includes a first inner surface, inner surfaces other than the first inner surface, a first outer surface, and outer surfaces other than the first outer surface. The first inner surface is located between the first outer surface and the thermal diffusing plate. The heat transfer coefficient between the first outer surface and an outside air of the casing is lower than the heat transfer coefficient between each of the outer surfaces other than the first outer surface and the outside air of the casing.

6 Claims, 4 Drawing Sheets

(51) Int. Cl.
*H01M 10/617* (2014.01)
*H01M 10/625* (2014.01)
*H01M 10/6556* (2014.01)
*H01M 10/658* (2014.01)
*H01M 2/10* (2006.01)
*H01M 10/643* (2014.01)
*H01M 10/6554* (2014.01)
*H01M 10/6561* (2014.01)
H01M 10/6563 (2014.01)
H01M 10/6564 (2014.01)
H01M 10/6566 (2014.01)

(52) U.S. Cl.
CPC .... *H01M 10/6566* (2015.04); *H01M 2220/20* (2013.01)

(56) References Cited

U.S. PATENT DOCUMENTS

2013/0017422 A1* 1/2013 Bae ............... H01M 2/1077 429/82
2015/0068826 A1* 3/2015 Kimura ............ B60L 11/1877 180/68.5

FOREIGN PATENT DOCUMENTS

| | | | |
|---|---|---|---|
| JP | 2008140630 | * | 6/2008 |
| JP | 2008308112 | * | 12/2008 |
| JP | 2014-093275 A | | 5/2014 |
| JP | 2014-144033 A | | 8/2014 |
| WO | 2013114426 A1 | | 8/2013 |
| WO | WO2013114426 | * | 8/2013 |

* cited by examiner

BATTERY PACK

INCORPORATION BY REFERENCE

The disclosure of Japanese Patent Application No. 2014-265171 filed on Dec. 26, 2014 including the specification, drawings and abstract is incorporated herein by reference in its entirety.

BACKGROUND OF THE INVENTION

1. Field of the Invention

The present invention relates to a structure of a battery pack.

2. Description of Related Art

As power sources for electric motor vehicles, such as hybrid vehicles and electric vehicles, there have been used battery packs configured by connecting a number of cylindrical batteries into battery sets, and housing these battery sets in cases. In such battery sets, a difference in temperature among the cylindrical batteries causes ununiformity of the charge-discharge behavior among the batteries, so that residual capacities of particular batteries become significantly decreased, which might result in progress of deterioration of the batteries. Accordingly, it is important for battery packs to uniformly maintain the temperature among a number of cylindrical batteries housed in cases.

The ambient temperature of a battery pack installed in a vehicle is affected by influences of change in outdoor temperature and heat generated by the vehicle, and thus, for example, one surface of the battery pack has a higher temperature than that of the other surfaces thereof depending on the installation place of the battery pack in the vehicle. To cope with this, there has been proposed a method of providing a thermal insulating layer to a surface to which temperature is transferred from a vehicle so as to uniformly maintain the temperature in an inside of a battery pack (see Japanese Patent Application Publication No. 2008-140630, for example).

There has recently been proposed a method of configuring a battery set by fitting plural cylindrical batteries into a metallic plate called as a thermal diffusing plate having a small thermal resistance. In a battery set using a thermal diffusing plate, the thermal diffusing plate having a small thermal resistance facilitates heat transmission among the cylindrical batteries, thus reducing a difference in temperature among the cylindrical batteries (see Japanese Patent Application Publication No. 2014-93275, for example).

The ambient temperature of the battery pack installed in the vehicle varies in all directions; therefore, a thermal insulating layer disposed to only one surface, as described in JP 2008-140630 A, cannot effectively suppress inflow of heat from the outside to the battery pack or outflow of heat from the battery pack to the outside, which makes it difficult to attain uniformity of temperature in the inside of the pack battery in some cases. In the battery set using the thermal diffusing plate as described in JP 2014-93275 A, even if the thermal insulating layer is provided only to the surface affected by thermal influence, as described in JP 2008-140630 A, an external thermal influence might cause variation in temperature in the thermal diffusing plate having a small thermal resistance. In such a case, variation in temperature of the thermal diffusing plate causes variation in temperature among the cylindrical batteries in some cases. Furthermore, disposing a thick thermal insulating layer around the entire circumference of the battery pack for the purpose of more strictly shutting off the external thermal influence might cause a problem of increase in dimension of the battery pack.

SUMMARY OF THE INVENTION

The present invention enables suppression of increase in dimension of the battery pack using the thermal diffusing plate, and also uniformity of temperature among the batteries.

A battery pack is provided. The battery pack includes a plurality of cylindrical batteries, a thermal diffusing plate, and a casing. The thermal diffusing plate holds the plurality of cylindrical batteries. The thermal diffusing plate is configured to transfer heat between the thermal diffusing plate and a cylindrical surface of each of the plurality of cylindrical batteries. The cylindrical surface is an outer peripheral surface of each of the plurality of cylindrical batteries. The casing houses the plurality of cylindrical batteries and the thermal diffusing plate. The casing includes a first inner surface, inner surfaces other than the first inner surface, a first outer surface, and outer surfaces other than the first outer surface. The first inner surface is located between the first outer surface and the thermal diffusing plate. The thermal diffusing plate is fixed to the first inner surface. A heat transfer coefficient between the first outer surface and an outside air of the casing is lower than a heat transfer coefficient between each of the outer surfaces other than the first outer surface and the outside air of the casing.

According to the above aspect of the invention, the battery pack further includes a cover. The cover is so disposed as to surround the casing. The cover includes a third inner surface and inner surfaces other than the third inner surface. The third inner surface opposes the first outer surface at a predetermined distance. Each of the outer surfaces other than the first outer surface opposes each of the inner surfaces other than the third inner surface, respectively. A distance between the first outer surface and the third inner surface is greater than each of respective distances between the outer surfaces other than the first outer surface and the inner surfaces other than the third inner surface.

According to the above aspect of the invention, the battery pack further includes a heat insulating layer. The heat insulating layer is so disposed as to surround the casing. A thickness of the heat insulating layer disposed on the first outer surface is larger than a thickness of the heat insulation layer disposed on the outer surfaces other than the first outer surface.

According to the above aspect of the invention, the battery pack further includes a heat insulating layer. The heat insulating layer is disposed in between the casing and the cover. A thickness of the heat insulating layer disposed in between the first outer surface and the third inner surface is larger than a thickness of the heat insulating layer disposed in between the outer surfaces other than the first outer surface and the inner surfaces other than the third inner surface.

According to the above aspect of the invention, the casing is configured to house a cooling air duct. The casing includes a second inner surface and a second outer surface. The cooling air duct is configured to send cooling air to the cylindrical batteries. The cooling air duct is fixed to the second inner surface. A heat transfer coefficient between the second outer surface and the outside air of the casing is lower than a heat transfer coefficient between each of the outer surfaces other than the first outer surface and the second outer surface and the outside air of the casing.

According to the above aspect of the invention, the battery pack further includes a cover. The cover is so disposed as to surround the casing. The cover includes a fourth inner surface and inner surfaces other than the fourth inner surface. The fourth inner surface opposes the second outer surface at a predetermined distance. Each of the inner surfaces other than the fourth inner surface opposes each of the outer surfaces other than the second outer surface, respectively. A distance between the second outer surface and the fourth inner surface is greater than each of respective distances between the outer surfaces other than the first outer surface and the second outer surface and the inner surfaces other than the third inner surface and the fourth inner surfaces.

The present invention promotes advantageous effects to suppress increase in dimension of the battery pack using the thermal diffusing plate, and also to attain uniformity of temperature among the batteries.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
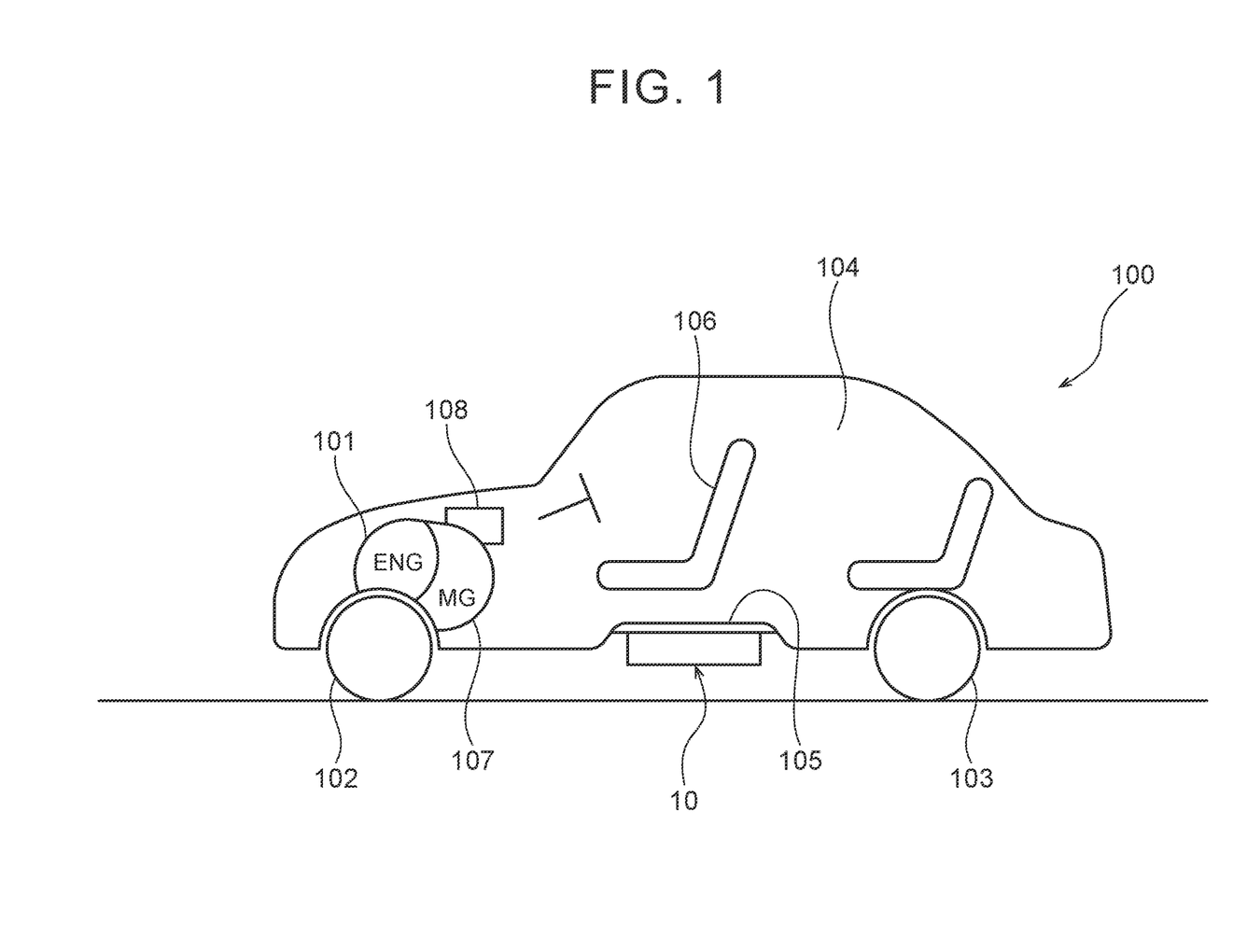
FIG. 1 is an explanatory view showing a state in which a battery pack according to an embodiment of the present invention is installed in a vehicle.

Embodiments of the present invention will be described with reference to the drawings, hereinafter. As shown in FIG. 1, a battery pack 10 of the present embodiment is hung to a lower surface of a floor plate 105 between front wheels 102 and rear wheels 103 of an electric motor vehicle 100, and more specifically, to the lower surface of the floor plate 105 near front seats 106 arranged in a vehicle interior 104.

Figure 2:
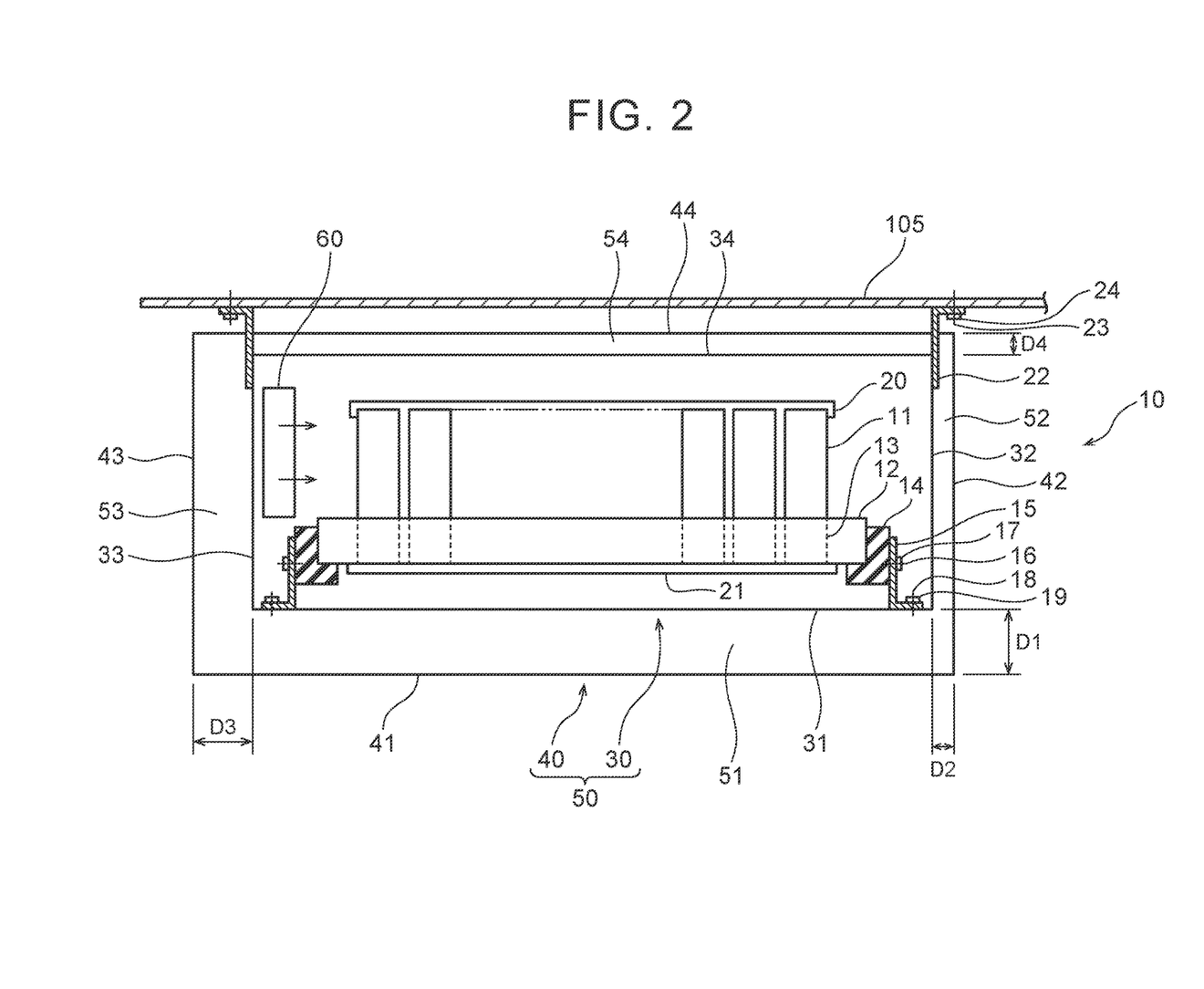
FIG. 2 is an elevation view of the battery pack according to the embodiment of the present invention.
Figure 3:
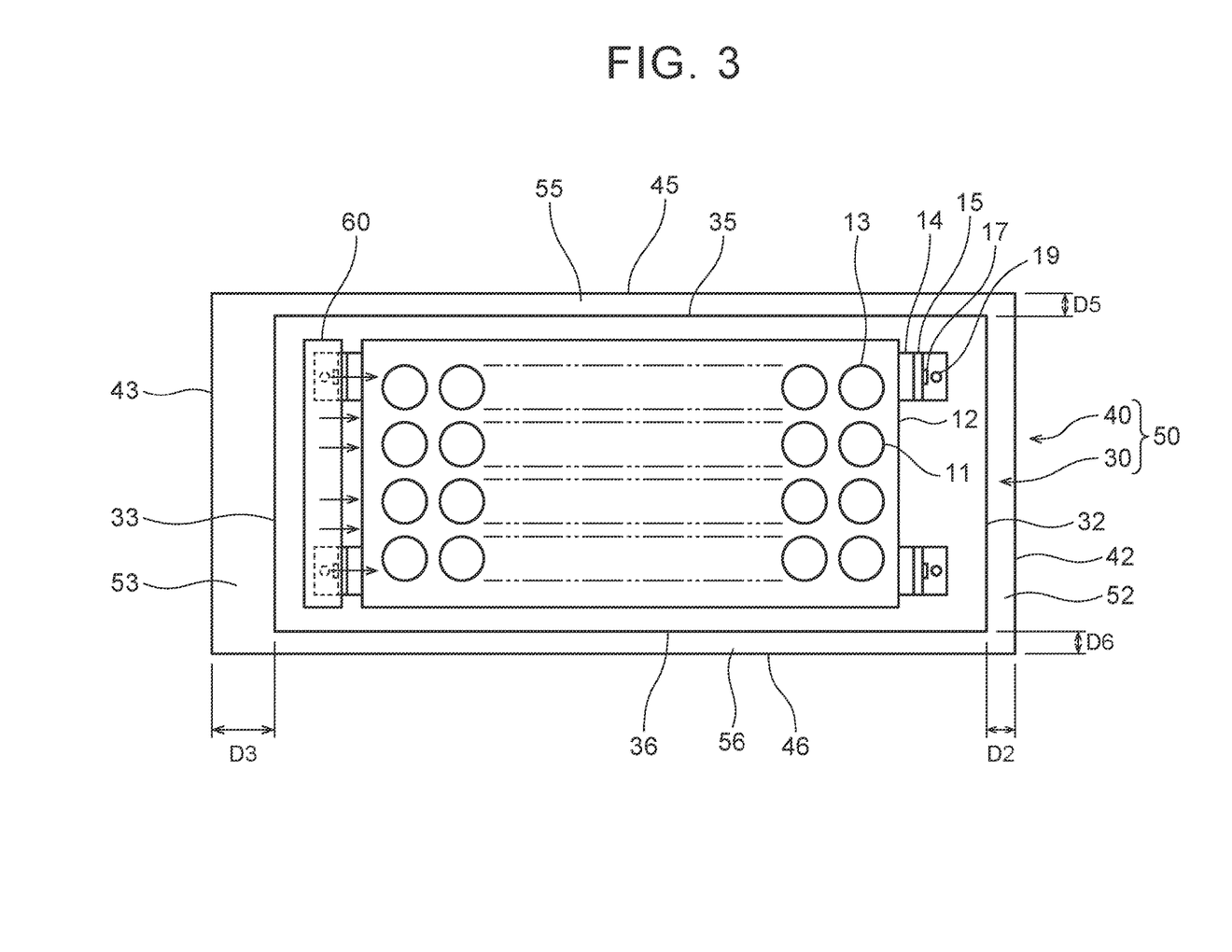
FIG. 3 is a plan view of the battery pack according to the embodiment of the present invention.

As shown in FIG. 2, the battery pack 10 of the present embodiment includes plural cylindrical batteries 11, a thermal diffusing plate 12 holding the cylindrical batteries 11, a casing 30 housing the cylindrical batteries 11 and the thermal diffusing plate 12, and a cover 40 covering a circumference of the casing 30 with a distance from a surface of the casing 30. The plural cylindrical batteries are the same elements as a plurality of cylindrical batteries. As shown in FIG. 2 and FIG. 3, air spaces 51 to 56 are formed between the casing 30 and the cover 40. The air spaces are examples of a heat insulating layer. Each cylindrical battery 11 is a chargeable and dischargeable secondary battery, such as a nickel-metal hydride battery and a lithium-ion battery, contained in a cylindrical case.

As shown in FIG. 2, each of an upper portion and a lower portion of each cylindrical battery 11 is provided with a positive electrode or a negative electrode, and connection is provided among the upper electrodes and among the lower electrodes, respectively via a not-shown conductor. An upper cover 20 and a lower cover 21 are respectively mounted on an upper portion and a lower portion of the conductor. The casing 30 is a substantially rectangular parallelepiped box made of metal for housing the cylindrical batteries 11 and the thermal diffusing plate 12 thereinside, and the casing 30 includes a bottom plate 31, a ceiling plate 34, and side plates 32, 33, 35 and 36, as shown in FIG. 2 and FIG. 3. As shown in FIG. 2, the casing 30 is fixed to the lower surface of the floor plate 105 with bolts 23 and nuts 24 via brackets 22 that are attached to the side plates 32, 33.

As shown in FIG. 3, the thermal diffusing plate 12 is a plate of metal, such as aluminum, provided with a number of through-holes 13 through which the cylindrical batteries 11 are inserted. An assembly of the cylindrical batteries 11 into the thermal diffusing plate 12 is carried out by putting the cylindrical batteries 11 into the through-holes 13, filling a gap between an inner surface (cylindrical surface) of each through-hole 13 and an outer surface (cylindrical surface) of each cylindrical battery 11 with an adhesive agent so as to fix the cylindrical batteries 11 to the corresponding through-holes 13. In this manner, by assembling the cylindrical batteries 11 into the through-holes 13 of the thermal diffusing plate 12, heat from the outer surfaces (cylindrical surfaces) of the cylindrical batteries 11 having a higher temperature is transferred to the thermal diffusing plate 12 by thermal conduction, thereby decreasing the temperature of the cylindrical batteries 11 having a higher temperature. Heat of the thermal diffusing plate 12 is then transferred by thermal conduction to the cylindrical batteries 11 having a lower temperature, thereby increasing the temperature of the cylindrical batteries 11 having a lower temperature. Specifically, each cylindrical battery 11 is retained by each through-hole 13 in a manner as to carry out heat transmission between the cylindrical surface of each cylindrical battery 11 and the thermal diffusing plate 12, and thus variation in temperature among the cylindrical batteries 11 is suppressed by the thermal diffusing plate 12. Hence, the thermal diffusing plate 12 is formed by a metallic material such as aluminum having a higher thermal conductivity so as to promote efficient heat transmission among the cylindrical batteries 11 through the thermal diffusing plate 12. A thickness of the thermal diffusing plate 12 is defined to be a thickness sufficient for holding the respective cylindrical batteries 11 by the cylindrical surfaces of the corresponding through-holes 13, and also carrying out effective heat transmission by thermal conduction, that is, for example, a thickness of approximately 10 to 20 mm, or approximately ¼ of a length of each cylindrical battery 11.

As shown in FIG. 2, FIG. 3, isolators 14 each of which is in an L-shape formed of resin are attached at lower corners of both longitudinal ends of the thermal diffusing plate 12. One surface of each bracket 15 in an L-shape is fixed to the end surface of each isolator 14 with a bolt 16 and a nut 17, and the other surface of each bracket 15 is fixed to an inner surface of the bottom plate 31 of the casing 30 with a bolt 18 and a nut 19. As aforementioned, the thermal diffusing plate 12 to which the cylindrical batteries 11 are fixed is fixed near the inner surface of the bottom plate 31 of the casing 30. There are provided spaces between the cylindrical batteries 11 and the ceiling plate 34 as well as the respective side plates, 32, 33, 35, 36 of the casing 30. As shown in FIG. 2, a cooling air duct 60 that sends a cooling air to cool the cylindrical batteries 11 is fixed in the vicinity of the inner surface of the side plate 33. The cooling air sent from the cooling air duct 60 as indicated by arrows in FIG. 2 and FIG. 3 flows through the cylindrical batteries 11, and also flows between the cylindrical batteries 11 and each of the bottom plate 31, the respective side plates 32, 33, 35, 36, and the ceiling plate 34 so as to cool the cylindrical batteries 11, and is then discharged from a not-shown air discharge port to the outside.

As shown in FIG. 2 and FIG. 3, the cover 40 is a substantially rectangular parallelepiped box formed of metal or resin, as similar to the casing 30, and includes a bottom plate 41, a ceiling plate 44, and respective side plates 42, 43, 45, 46 that oppose the bottom plate 31, the ceiling plate 34, and the side plates 32, 33, 35, 36, respectively. The cover 40 is fixed to the casing 30 via a not-shown connecting plate. As shown in FIG. 2, a distance between an outer surface of the bottom plate 31 of the casing 30 and an inner surface of the bottom plate 41 of the cover 40 is a separating distance D1, a distance between an outer surface of the side plate 32 of the casing 30 and an inner surface of the side plate 42 of the cover 40 is a separating distance D2, a distance between an outer surface of the side plate 33 of the casing 30 and an inner surface of the side plate 43 of the cover 40 is a separating distance D3, and a distance between an outer surface of the ceiling plate 34 of the casing 30 and an inner surface of the ceiling plate 44 of the cover 40 is a separating distance D4. As shown in FIG. 3, a distance between an outer surface of the side plate 35 of the casing 30 and an inner surface of the side plate 45 of the cover 40 is a separating distance D5, and a distance between an outer surface of the side plate 36 of the casing 30 and an inner surface of the side plate 46 of the cover 40 is a separating distance D6.

In the battery pack 10 of the present embodiment, the separating distance D1 is greater than each of the other separating distances D2 to D6. Specifically, the separating distance D1 at the bottom plate 41 of the cover 40 that oppose the bottom plate 31 of the casing 30 to which the thermal diffusing plate 12 is fixed is configured to be greater than each of the separating distances D2 to D6 at the side plates 42, 43, 45, 46 and the ceiling plate 44 of the cover 40 that oppose the side plates 32, 33, 35, 36 and the ceiling plate 34 of the casing 30. The separating distance D3 is greater than each of the separating distances D2, D4 to D5, and smaller than the separating distance D1. Specifically, the separating distance D3 at the side plate 43 of the cover 40 that opposes the side plate 33 of the casing 30 to which the cooling air duct 60 is attached is greater than each of the separating distances D2, D4 to D6 of the side plates 42, 45, 46, and the ceiling plate 44 of the cover 40 that oppose the side plates 32, 35, 36, and the ceiling plate 34 of the casing 30. In the present embodiment, the separating distance D3 is smaller than the separating distance D1. The respective spaces between the side plates 31 to 36 of the casing 30 and the side plates 41 to 46 of the cover 40 are filled with air, and the separating distances D1 to D6 correspond to respective thicknesses D1 to D6 of air spaces 51 to 56 as well. Hence, in the battery pack 10 of the present embodiment, the thickness D1 of the air space 51 is configured to be greater than each of the thicknesses D2 to D6 of the other air spaces 52 to 56. Specifically, the thickness D1 of the air space 51 at the bottom plate 41 of the cover 40 opposing the bottom plate 31 of the casing 30 close to the thermal diffusing plate 12 is configured to be greater than each of the thicknesses D2 to D6 of the air spaces 52 to 56 at the side plates 42, 43, 45, 46, and the ceiling plate 44 of the cover 40 that oppose the side plates 32, 33, 35, 36, and the ceiling plate 34 of the casing 30. The thickness D3 of the air space 53 is greater than each of the thicknesses D2, D4 to D6 of the air spaces 52, 54 to 56, and smaller than the thickness D1 of the air space 51. Specifically, the thickness D3 of the air space 53 between the side plate 43 of the cover 40 and the opposite side plate 33 of the casing 30 to which the cooling air duct 60 is attached with a close distance is configured to be greater than each of the thicknesses D2, D4 to D6 of the air spaces 52, 54 to 56 between the side plates 42, 45, 46, the ceiling plate 44 of the cover 40 and the opposite side plates 32, 35, 36, and the ceiling plate 34 of the casing 30. In the present embodiment, the thickness D3 of the air space 53 is smaller than the thickness D1 of the air space 51.

As shown in FIG. 1, the lower surface of the floor plate 105 of the electric motor vehicle 100 in which the battery pack 10 is installed is located outside the vehicle interior 104, and thus, is affected by influence of the ambient temperature of the electric motor vehicle 100 and influence of heat generated from an engine 101, an electric motor 107, a power converter 108, and others that are installed in the electric motor vehicle 100. For example, the lower surface might be heated from the surroundings by an exhaust gas or the like drifting around from a not-shown radiator. In the winter time, heat diffusion of the battery pack 10 might occur because of the lower-temperature outside air. Change in ambient temperature of the battery pack 10 is caused in all directions of the battery pack 10. If such change in ambient temperature of the battery pack 10 is transferred to the inside of the casing 30, the temperature of the thermal diffusing plate 12 configured by using a metallic material having a high thermal conductivity is also changed, which might result in increase or decrease in temperature of the cylindrical batteries 11 fixed to the thermal diffusing plate 12, or cause variation in temperature of the cylindrical batteries 11.

To cope with this, in the battery pack 10 of the present embodiment, the cylindrical batteries 11 and the thermal diffusing plate 12 are housed in a double casing 50 including the air spaces 51 to 56 between cases thereof, thereby suppressing transfer of change in ambient temperature of the battery pack 10 in all directions to the casing 30 so as to promote uniformity of internal temperature of the double casing 50. In the battery pack 10 of the present embodiment, the separating distance D1 between the bottom plate 31 to which the thermal diffusing plate 12 is fixed with a close distance and the bottom plate 41 of the cover 40 opposing this bottom plate 31 is configured to be greater so as to set the thickness of the air space 51 to be greater, thereby decreasing a heat transfer coefficient from the outside to the bottom plate 31 to which the thermal diffusing plate 12 is fixed, thus further suppressing heat transfer. Accordingly, it is not configured that the separating distance, that is, the thickness of the air space between the casing 30 and the cover 40 is set to be great through the entire circumference of the battery pack 10 in order to cope with change in ambient temperature thereof in all directions, but it is configured that only the separating distance D1 between the bottom plate 31 close to the thermal diffusing plate 12 that causes a significant influence to the temperature of the cylindrical batteries 11 and the bottom plate 41 of the cover 40 is set to be greater so as to decrease the heat transfer coefficient only in this portion, thereby suppressing increase in dimension of the battery pack 10 as well as more effectively suppressing change in temperature of the thermal diffusing plate 12 or variation in temperature of the thermal diffusing plate 12. Furthermore, it is possible to suppress change in temperature of the cylindrical batteries 11 fixed to the thermal diffusing plate 12, or suppress variation in temperature among the cylindrical batteries 11 so as to attain uniformity of temperature among the cylindrical batteries 11.

In the battery pack 10 of the present embodiment, it is configured to set the separating distance D3 (thickness D3 of the air space 53) between the side plate 43 of the cover 40 and the opposite side plate 33 of the casing 30 close to the cooling air duct 60 to be greater so as to suppress change in temperature of the cooling air duct 60 and of the air sent from the cooling air duct 60 due to change in ambient temperature of the battery pack 10. Through this configuration, it is possible to suppress increase in dimension of the battery pack 10 as well as secure a cooling effect of the cylindrical batteries 11 regardless of the ambient temperature of the battery pack 10, and it is also possible to effectively suppress change in temperature or variation in temperature of the cylindrical batteries 11 because of change in temperature of the cooling air.

As aforementioned, the battery pack 10 of the present embodiment is capable of suppressing increase in dimension of the battery pack 10, as well as uniformizing the internal temperature of the casing 30 of the battery pack 10 and the temperature of the cylindrical batteries 11 housed in the casing 30.

Hereinafter, a battery pack 70 of another embodiment will be described with reference to FIG. 4. The same reference numerals are used for components that are common to the embodiment previously described with reference to FIG. 1 to FIG. 3, and overlapping description thereof will be omitted. It has been explained that in the battery pack 10 of the previously described embodiment, the thermal diffusing plate 12 is attached to the bottom plate 31 of the casing 30, but as shown in FIG. 4, the thermal diffusing plate 12 may be fixed along each of the side plates 35, 36 of the casing 30.

Figure 4:
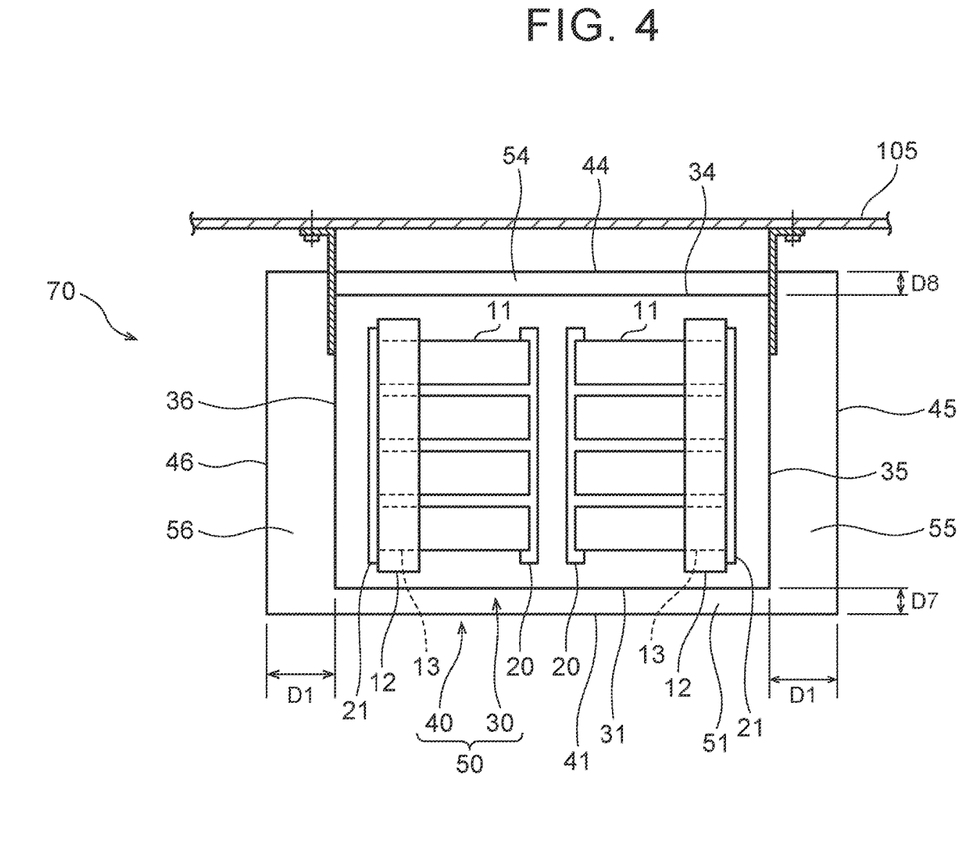
FIG. 4 is an elevation view of a battery pack according to another embodiment of the present invention.

FIG. 4 shows that the thermal diffusing plates 12 to each of which the plural cylindrical batteries 11 are fixed are attached to the side plates 35, 36, respectively. As shown in FIG. 4, in the battery pack 70 of the present embodiment, the thermal diffusing plates 12 are fixed, and each separating distance D1 (each thickness D1 of the air spaces 55, 56) at the side plates 45, 46 of the cover 40 that respectively oppose the side plates 35, 36 of the casing 30 close to the respective thermal diffusing plates 12 is set to be greater than each of separating distances D7, D8 (thicknesses D7, D8 of the air spaces 51, 54) at the bottom plate 41 and the ceiling plate 44 of the cover 40 that oppose the bottom plate 31 and the ceiling plate 34 of the casing 30. In the battery pack 70 of the present embodiment, as similar to the aforementioned embodiment, the separating distance D1 (each thickness D1 of the air spaces 55, 56) at the side plates 45, 46 of the cover 40 that oppose the side plates 35, 36 close to the thermal diffusing plate 12 is set to be greater than each thickness of the other air spaces 51, 54, thus decreasing only the heat transfer coefficient from the outside to the side plates 35, 36 located close to the thermal diffusing plate 12 so as to further suppress heat transfer in this portion. Accordingly, as similar to the aforementioned embodiment, it is possible to suppress increase in dimension of the battery pack 70 as well as promote uniformity of temperature among the cylindrical batteries 11.

In the aforementioned embodiments, it has been explained that the air spaces 51 to 56 are formed between the respective plates 31 to 36 of the casing 30 and the corresponding plates 41 to 46 of the cover 40. However, as far as the heat transfer coefficient between the bottom plate 31 of the casing 30 in which the thermal diffusing plate 12 is fixed and an outside air outside the bottom plate 31 is lower than the heat transfer coefficient between each outer surface of the other plates 32 to 36 of the casing 30 and an outside air thereof, for example, a thermal insulating material or the like may be disposed between the respective plates 31 to 36 of the casing 30 and the corresponding plates 41 to 46 of the cover 40, instead of disposing the air spaces, in such a manner that the thickness of the thermal insulating material on the outside of the bottom plate 31 of the casing 30 in which the thermal diffusing plate 12 is fixed is set to be greater than the thickness of the thermal insulating material on each outer surface of the other plates 32 to 36 of the casing 30. In addition, in order to prevent increase in heat transfer coefficient due to a convection current of the air in the respective air spaces 51 to 56, it may be configured to provide plates for suppressing the convection current between the respective plates 31 to 36 of the casing 30 and the corresponding plates 41 to 46 of the cover 40.

In the aforementioned embodiments, it has been explained that each of the plates 31 to 36 of the casing 30, and each of the plates 41 to 46 of the cover 40 are flat plates as shown in FIG. 2 to FIG. 4, but the plates 31 to 36 and the plates 41 to 46 may be corrugated plates having reinforcing ribs or the like or folded plates, for example. In this case, the separating distances D1 to D6 between the respective plates 31 to 36 and the corresponding plates 41 to 46 may be an average separating distance among the plates 31 to 36 and the plates 41 to 46. Furthermore, in the aforementioned embodiments, it has been explained that the cover 40 is attached to the casing 30, but the cover 40 may be fixed to the electric motor vehicle 100. In this case, for example, the casing 30 in which the cylindrical batteries 11 and the thermal diffusing plate 12 are housed is attached to the electric motor vehicle 100, and thereafter, the cover 40 is mounted in a manner as to cover the casing 30 from the outside, and is then fixed to the electric motor vehicle 100.

What is claimed is:

1. A battery pack comprising:
    a plurality of cylindrical batteries;
    a thermal diffusing plate holding the plurality of cylindrical batteries, the thermal diffusing plate being configured to transfer heat between the thermal diffusing plate and a cylindrical surface of each of the plurality of cylindrical batteries, the cylindrical surface being an outer peripheral surface of each of the plurality of cylindrical batteries;
    a casing housing the plurality of cylindrical batteries and the thermal diffusing plate, wherein
    the casing includes a first inner surface, inner surfaces other than the first inner surface, a first outer surface, and outer surfaces other than the first outer surface, wherein the first outer surface and the outer surfaces other than the first outer surface comprise all outer surfaces of the casing,
    the first inner surface is located between the first outer surface and the thermal diffusing plate,
    the thermal diffusing plate is fixed to the first inner surface, and
    a heat transfer coefficient between the first outer surface and an outside air of the casing is lower than a heat transfer coefficient between each of the outer surfaces other than the first outer surface and the outside air of the casing; and
    a cover, wherein the cover is disposed so as to surround the first outer surface and all of the outer surfaces other than the first outer surface of the casing,
    the cover includes a third inner surface and inner surfaces other than the third inner surface,
    the third inner surface of the cover faces the first outer surface of the casing so as to be spaced apart from the first outer surface of the casing,
    each of the outer surfaces other than the first outer surface of the casing faces each of the inner surfaces other than the third inner surface of the cover, respectively, so as to be spaced apart from each of the inner surfaces other than the third inner surface, and a distance between the first outer surface of the casing and the third inner surface of the cover is greater than each of respective distances between the outer surfaces other than the first outer surface and the inner surfaces other than the third inner surface.

2. The battery pack according to claim 1 further comprising a heat insulating layer, wherein the heat insulating layer is so disposed as to surround the casing, a thickness of the heat insulating layer disposed on the first outer surface is larger than a thickness of the heat insulation layer disposed on the outer surfaces other than the first outer surface.

3. The battery pack according to claim 1 further comprising a heat insulating layer, wherein the heat insulating layer is disposed in between the casing and the cover, a thickness of the heat insulating layer disposed in between the first outer surface and the third inner surface is larger than a thickness of the heat insulating layer disposed in between the outer surfaces other than the first outer surface and the inner surfaces other than the third inner surface.

4. The battery pack according to claim 1, wherein the casing is configured to house a cooling air duct, the casing includes a second inner surface and a second outer surface, the cooling air duct is configured to send cooling air to the cylindrical batteries, the cooling air duct is fixed to the second inner surface, and a heat transfer coefficient between the second outer surface and the outside air of the casing is lower than a heat transfer coefficient between each of the outer surfaces other than the first outer surface and the second outer surface and the outside air of the casing.

5. The battery pack according to claim 4, wherein the cover includes a fourth inner surface and inner surfaces other than the fourth inner surface, the fourth inner surface faces the second outer surface so as to be spaced apart from the second outer surface, each of the inner surfaces other than the fourth inner surface faces each of the outer surfaces other than the second outer surface, respectively, so as to be spaced apart from each of the outer surfaces other than the second outer surface, and a distance between the second outer surface and the fourth inner surface is greater than each of respective distances between the outer surfaces other than the first outer surface and the second outer surface and the inner surfaces other than the third inner surface and the fourth inner surfaces.

6. The battery pack according to claim 1, wherein the first outer surface of the casing is an outermost surface of the casing.

* * * * *